United States Patent [19]

Emrick et al.

[11] 4,199,665
[45] Apr. 22, 1980

[54] METHOD AND ARRANGEMENT FOR CONTROLLING TRAFFIC OVER TWO-WAY TRUNKS

[75] Inventors: Arthur J. Emrick, Gahanna, Ohio; Arthur A. Maki, Claremont, Calif.

[73] Assignee: Bell Telephone Laboratories, Incorporated, Murray Hill, N.J.

[21] Appl. No.: 965,419

[22] Filed: Dec. 1, 1978

[51] Int. Cl.² ............................................. H04M 7/10
[52] U.S. Cl. .............................................. 179/18 AG
[58] Field of Search ....... 179/18 AG, 18 AH, 18 EA, 179/18 ES

[56] References Cited

U.S. PATENT DOCUMENTS

3,504,129  3/1970  Ewin et al. ..................... 179/18 AG
3,700,822  10/1972  Fritschi ......................... 179/18 AH Primary Examiner—Thomas W. Brown
Attorney, Agent, or Firm—Charles H. Davis

[57] ABSTRACT

A toll switching office is disclosed having an arrangement for reserving a portion of a two-way trunk group for incoming calls only. As each outgoing call is offered to the trunk group the number of idle trunks is compared to the threshold of trunks to be reserved for incoming calls. If the number of idle trunks in the group is less than the threshold the treatment of the outgoing call is determined by its class which is defined by parameters such as its prior routing, its destination, etc. More calls in a class having a high probability of blocking are selectively denied access to the trunk groups than calls more likely to complete to their destination.

7 Claims, 10 Drawing Figures

Z9CRSP1

| | A | B | C | D |
|---|---|---|---|---|
| ALTERNATE ROUTED AND HARD-TO-REACH | 100% | 100% | 100% | 100% |
| FIRST ROUTED AND HARD-TO-REACH | 0% | 50% | 75% | 100% |
| ALTERNATE ROUTED | 0% | 0% | 50% | 100% |
| FIRST ROUTED | 0% | 0% | 0% | 100% |

Z9CRSP2

| | A | B | C | D |
|---|---|---|---|---|
| ALTERNATE ROUTED AND HARD-TO-REACH | 100% | 100% | 100% | 100% |
| FIRST ROUTED AND HARD-TO-REACH | 75% | 0% | 100% | 100% |
| ALTERNATE ROUTED | 0% | 25% | 50% | 100% |
| FIRST ROUTED | 0% | 0% | 25% | 100% |

| | | | | | |
|---|---|---|---|---|---|
| 0 | T3TIN / T3GFWDOLG | T3TGILNK | T3NUMBDS | | |
| 1 | (ADDRESS OF BUSY/IDLE BIT TABLE T3BIB) | | | | |
| 2 | | | | | |
| 3 | | | | | |
| 4 | | | | | |
| 5 | (ADDRESS OF WORK MANAGEMENT TABLE Z9NET) | | | | |
| 6 | | | | | |
| 7 | | | | | |
| 8 | T3TGLINK (T3TGVLNK / T3STOPSEL / T3TGNXLNK) | T3TWOWAY | T3TERM | T3BAND | |
| 9 | SAME AS ABOVE FOR 2, 4, 6, OR 8 BANDS | | | | |
| 10 | | | | | |
| 11 | | | | | |

METHOD AND ARRANGEMENT FOR CONTROLLING TRAFFIC OVER TWO-WAY TRUNKS

TECHNICAL FIELD

This invention relates to telephone systems, and particularly to improvements for controlling the flow of traffic in a telephone system.

In a more particular aspect, this invention relates to a method and arrangement for controlling traffic offered to two-way trunk groups.

BACKGROUND OF THE INVENTION

The smooth functioning of a long distance telephone communications system depends on the skillful managing of the telephone network and switching offices serving the network. Traffic loads can build up rapidly in portions of a network due to failures in other parts of the network or due to mass calling into a specific area. To insure optimum utilization of facilities it is necessary to monitor, measure and control the flow of traffic in different parts of the network.

Depending on the amount of and direction of traffic flowing between switching offices, one-way or two-way trunk groups may be provided. Two-way trunk groups, of course, offer the advantage of serving traffic in either direction between two offices depending on the demands of the system.

Although it is advantageous to provide two-way trunk groups, these trunk groups suffer from the problem of "glare," a condition which exists when a two-way trunk is simultaneously seized at both ends and neither switching office can utilize the trunk unless the other office releases. Furthermore, two-way trunk groups can be dominated by either end office to the detriment of the other office, unless controls are implemented so that each office can have its fair share of the common trunk group.

In the past, two-way trunk groups have been regulated under the control of a clock so that certain trunks are directionalized, i.e., temporarily made one-way trunks, to serve one office during certain times of the day. An example of one such system is disclosed in U.S. Pat. No. 2,769,864 issued to C. O. Parks on Nov. 6, 1956. While these arrangements are wholly suitable for their intended purposes, they have certain disadvantages. For example, the trunk group is often directionalized based on the history of traffic between the two offices. This history, being a past record, does not reflect the current traffic situation between the offices and does not take into account other traffic situations in other parts of the network which may also affect the traffic between the two offices served by the two-way trunk group.

Also, the calls offered to an interoffice trunk group in a toll network have many different origins and destinations. The probability of a successful completion of a particular call, therefore, depends on what the call's prior routing has been and what its final destination is, in addition to the availability of trunks in the two-way trunk group under consideration.

Accordingly, a need exists for a method and arrangement for dynamically controlling traffic over a two-way trunk group on a call-by-call basis so that calls from one office which have a high probability of completion are routed over the two-way trunk group without degrading traffic flow from the other office sharing the trunk group.

DESCRIPTION OF THE INVENTION

The foregoing problem is solved and a technical advance is achieved by an arrangement whereby a network manager can implement special programs of a program-controlled switching office to control traffic over a two-way trunk group between the offices designated herein as offices A and B. More specifically, the manager can designate at switching office A the number of trunks to be reserved for traffic incoming from office B. As each call for the two-way trunk group is processed at office A, the number of idle trunks are counted and compared to the number designated by the network manager. If there are sufficient idle trunks reserved for calls incoming from office B, calls at switching office A may be offered to the two-way trunk group.

In accordance with a feature of the invention, selected percentages of calls of different categories are offered to the trunk group when sufficient trunks have been reserved for calls incoming from office B. More specifically, the calls at office A are categorized based on their final destination and their routing prior to reaching office A. The categories of calls are ranked and a selected percentage of each category is permitted access to the controlled two-way trunk group. The percentage of calls differs with each category so that a higher percentage of calls having a greater probability of completion are offered to the controlled trunk group while a small percentage of calls that are unlikely to complete are offered to the same trunk group.

DETAILED DESCRIPTION

The invention may be advantageously employed in any type of telephone switching system, but for ease of illustration, the invention will be described with respect to the switching system disclosed in U.S. Pat. No. 3,564,149, issued to C. J. Funk et al. on Feb. 16, 1971. The Funk et al. disclosure sets forth portions of a toll switching system similar to the switching system disclosed in U.S. Pat. No. 2,868,884, issued to J. W. Gooderham et al. on Jan. 13, 1959 and a stored program control system such as the one disclosed in Volume XLIII, No. 5 of the *Bell System Technical Journal*, Sept. 1964. Of course, it will be obvious to those skilled in the art that other switching systems and other stored program control systems can be utilized, without departing from the spirit and scope of the invention.

Figure 1:
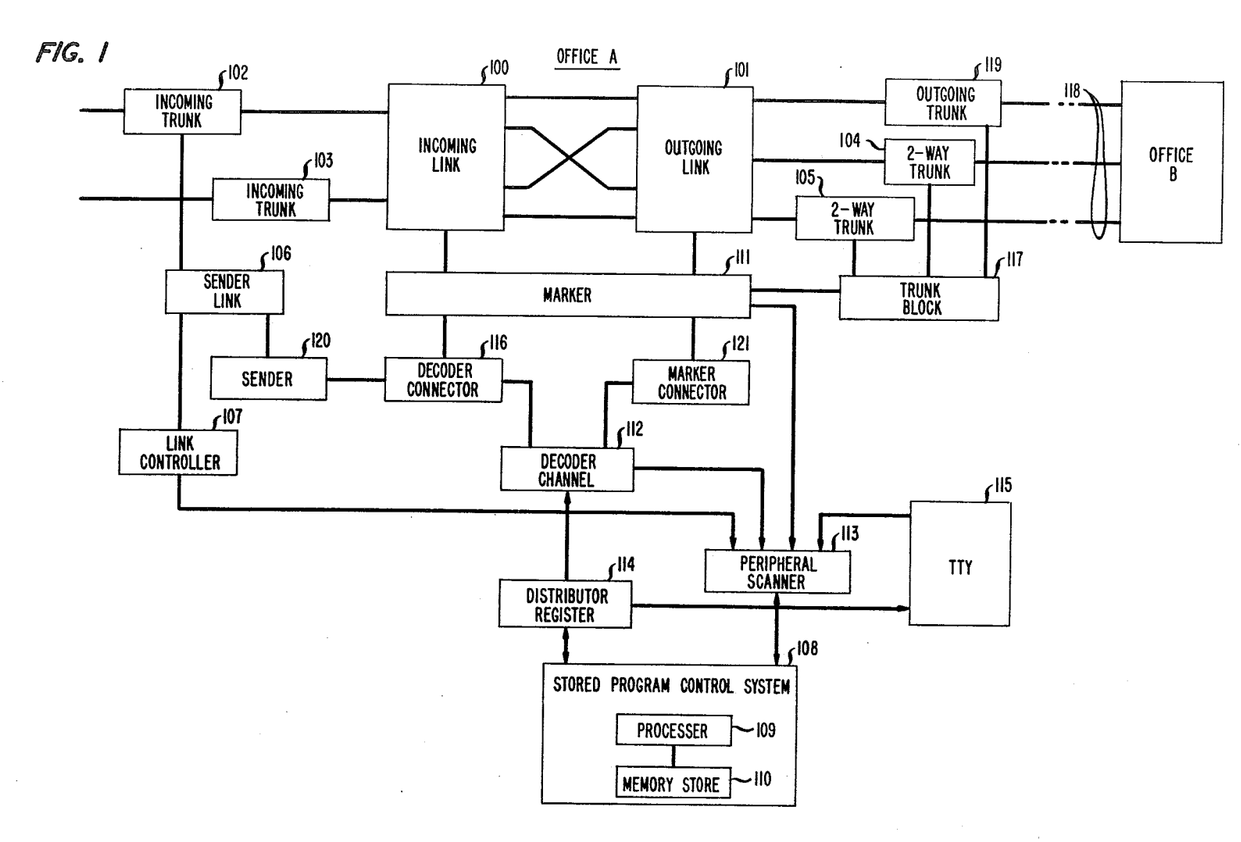
FIG. 1 shows a block diagram of a typical toll switching office utilizing the invention.

FIG. 1 shows a block diagram of a typical toll switching office A. Calls are switched through the toll office by means of two sets of switch frames designated incoming link 100 and outgoing link 101. Calls incoming to the office A are received over incoming trunks such as 102 and 103, which are terminated on incoming link 100, while calls are forwarded to distant offices such as office B over two-way trunks such as 104 and 105, or one-way outgoing trunks such as 119.

When a trunk is seized at its originating end, the incoming trunks such as 102 bids for an idle sender 120 via sender link 106 and link controller 107. Link controller 107 establishes a connection between the incoming trunk 102 and sender 120 and the called destination number is outpulsed from the originating end and stored in sender 120.

The stored program control system 108 is a high-speed data processing facility which is time-shared among the various other units of common equipment in the switching system. Stored program control system 108 can be divided functionally into a processor 109 and a memory store 110 plus other equipment which has not been shown to simplify the drawing. The processor 109 contains most of the logic and control circuitry for the stored program control system 108. It controls the operation of the system by executing a sequence of instruction which are stored in memory store 110.

Memory store 110 is an electrically alterable memory having nondestructive readout capabilities. In addition to being used as a permanent storage facility for programs which are to be executed by processor 109, memory store 110 is also used for temporarily storing call processing data.

In the particular system being described connections between incoming and outgoing or two-way trunks are established via the incoming and outgoing links under control of a marker, such as marker 111. The called number translation and route selection are performed by the stored program control system 108. For interconnecting the high-speed electronic stored program control system 108 with the slower-speed electromechanical control units such as marker 111, buffer circuits are provided. The input buffers to the stored program control system 108 are the peripheral scanners such as 113. Peripheral scanner 113 comprises a matrix of current-sensitive devices which are used for monitoring leads from the various circuits, such as link controller 107, marker 111, decoder channel 112 and teletypewriter terminal 115. Periodically, selected rows of the current-sensitive devices are addressed, and it is over the leads that are scanned that the stored program control system recognizes bids for service and receives input data from the other control units in the system. A scanner suitable for use in the present arrangement is disclosed and described in in U.S. Pat. No. 3,254,157 to A. N. Guercio et al. on May 31, 1966.

Distributor registers such as 114 are the output buffers of the stored program control system 108 and are used to transmit directive information from the stored program control system 108 to the various electromechanical control circuits such as decoder channels and terminal 115.

Terminal 115 is the man machine interface used by the network manager for communicating with the stored program control system 108. It is through the utilization of terminal 115 that the network manager can alter routing programs stored in memory store 110 and implement changes in trunk selection to accommodate varying traffic patterns.

As mentioned above, sender 120 is attached to the incoming trunk 102 to receive the called number from the originating office. After sufficient digits have been registered in the sender, sender 120 requests a decoder channel 112 via decoder connector 116. Decoder channel 112 provides sender access to the stored program control system 108 for translating the digital information received over the incoming trunk.

Recognizing a request for route translation, processor 109 directs scanner 113 to read the called number digits in decoder channel 112 after the digits have been forwarded from sender 120. The identity of the incoming trunk and the sender attached thereto were priorly recorded in memory 110 during the connection of the sender 120 to trunk 102 by link controller 107. Using this information, the processor 109 can determine the trunk class information for incoming trunk 102. With the trunk class information and the called office code, processor 109 can interrogate numerous tables in memory 110 to ascertain the proper outgoing trunk route and the equipment location of idle trunks Let it be assumed that the call from incoming trunk 102 is destined for office B and will be routed via one of the two-way trunks in the group 118 including trunks 104 and 105. This information is distributed by processor 108 to marker 111 via distributor register 114 and decoder channel 112. Marker 111, using trunk block 117, selects an idle trunk 104 or 105 and then establishes a cross-office channel to the selected trunk via incoming and outgoing links 100 and 101. Sender 105 is then signaled to outpulse the called number over this established channel to the destination office B.

As discussed above, two-way trunk groups are subject to problems in that either office can dominate the trunk group to the detriment of the other office. Thus, if there is a heavy demand for traffic from office A to office B, office A may utilize all trunks in the group and block any traffic attempting to complete in the opposite direction from office B to office A.

To avoid problems such as this, the network manager can implement special programs in stored program control system 108 at office A, so that some of the two-way trunks to office B will be reserved for traffic incoming from office B. This arrangement is referred to herein as "selective trunk reservation," and is implemented under control of the network manager by typing a message into system 108 via terminal 115.

In example being described, the manager can implement controls at two threshold levels (SRL1, SRL2) on the two-way trunk group and his decision to implement a particular threshold control is based on observation of traffic flow in the entire network. Of course, while only two levels of control are described, it will be obvious to those skilled in the art, that the invention is not limited thereto.

The manager has facilities which monitor the network for switching office congestion, trunk congestion and other indicia of network performance. These facilities are well known in the art and need not be discussed herein for a complete understanding of the invention.

As will be appreciated from the ensuing description, the two-way trunks are not actually made busy at office A to insure their availability at office B. Instead, the manager selects one of the two threshold levels and designates the number of trunks that must be idle or the reservation control will be implemented. If the number of idle two-way trunks in the group drops below the selected threshold level, then calls will be selectively denied access to the trunk group at office A.

In addition to the two thresholds of trunk reservation mentioned above, the arrangement being described contemplates four different levels of response at each threshold. These responses are designated category responses A through D, and each category response will selectively block different percentages of traffic to the trunk group, depending on the nature or classes of the calls.

Figure 2:
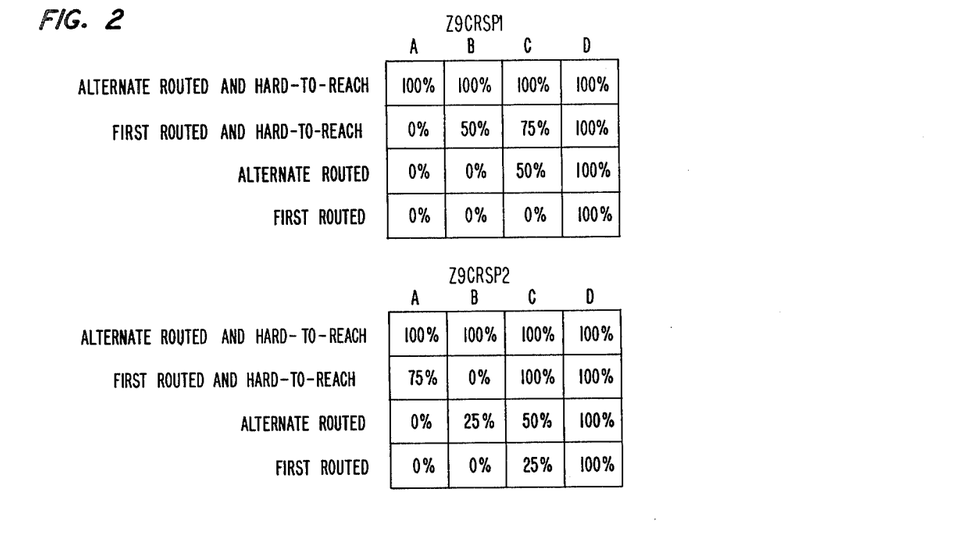
FIG. 2 shows portions of the category response tables of the stored program control system memory.

The category response concept is better understood with reference to FIG. 2 of the drawing.

FIG. 2 shows category response tables Z9CRSP1 and Z9CRSP2 which are in reality part of memory store 110. The upper table is for selective trunk reservation level 1 (SRL1) and the lower table is for selective trunk reservation level 2 (SRL2). Both tables are provided for each trunk group that is subject to control. Each table can be considered a 4×4 matrix of entries wherein the category responses A through D are indexed along on the horizontal coordinate while the four types or classes of traffic being processed are indexed along the vertical coordinate. At the intersection of each coordinate a percentage figure is entered to indicate the percentage of traffic to be controlled for a particular category response and a particular class of call.

While many different classes of traffic can be controlled, the four classes of calls to be controlled in this illustrative embodiment are (1) first routed; (2) alternate routed; (3) first routed hard-to-reach; and (4) alternate routed hard-to-reach. First routed calls are those calls whose first choice trunk route out of office A is via the trunk route 118 while alternate routed calls are those calls which have a different first choice route but may alternate route over trunk route 118 if the first choice trunks are unavailable. Hard-to-reach traffic (both first choice and alternate routed) is determined by analysis of the destination of the call. More specifically, traffic studies show that certain destination offices are hard to reach from a particular toll office due to many factors such as lack of adequate trunking facilities to the destination office. A hard-to-reach destination is not limited to a specific called office code but could also include a particular called customer directory number or an entire foreign numbering plan area.

The category responses A through D denote the percentage of traffic to be blocked to a route depending on the class of call with category D blocking a greater percentage of traffic than category A for the same trunk route.

When the network manager designates a trunk reservation level and a category response for the trunk group, the treatment of calls offered to the trunk group is dictated by the parameters set forth in the category response tables of FIG. 2. For example, if category response A is designated for trunk group 118 and the threshold level (SRL1) of idle trunks is met, only alternate routed hard-to-reach traffic will be blocked from accessing the trunk group. If category response C had been selected and the first reservation level of idle trunks (SRL1) had been reached, (1) all alternate routed hard-to-reach traffic, (2) 75% of the first routed hard-to-reach traffic and (3) 50% of the altnenate routed traffic would be blocked from the trunk group. No first routed traffic will be blocked. Note that in the example being described, when the second threshold level of trunks idle (SRL 2) is reached, the lower table in FIG. 2 is used and the blocking is more severe for the above mentioned types of calls. Of course, the percentage control is entered in the table at the discretion of the network manager and any percentage figure can be used in either table.

Figure 3:
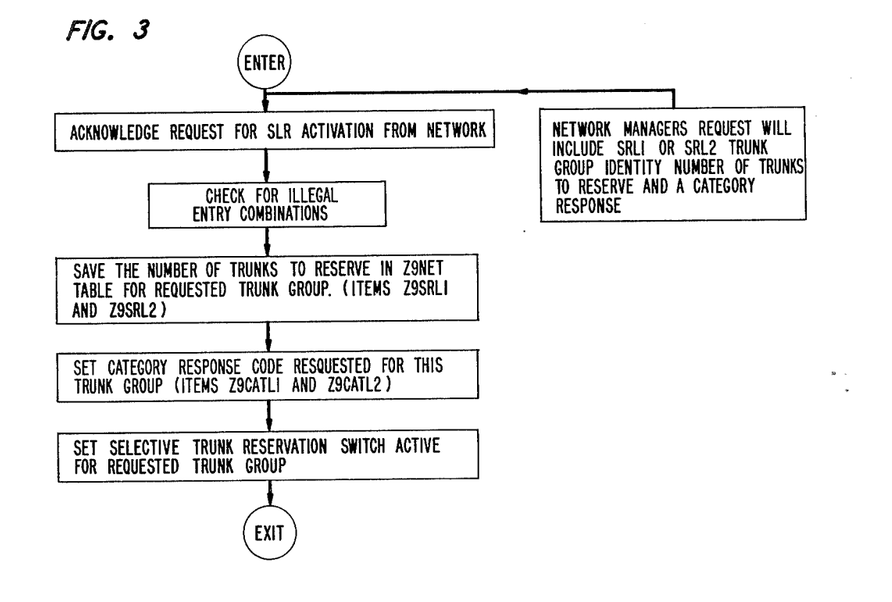
FIG. 3 shows a typical flow chart of the processor operation when the selective trunk reservation controls are activated.

To implement a selective reservation on trunk group 118, the network manager utilizes teletypewriter terminal 115 to type a message into processor 109. Processor 109 reads the message via scanner 113 and is programmed to process the message in accordance with the flow chart shown on FIG. 3.

As part of its standard program, processor 109 periodically directs scanner 113 to certain addresses looking for bids for service. Recognizing a bid from terminal 115 processor 109 reads the message sent by the network manager. The message will contain (1) the identity of the trunk group 118, (2) the number of trunks to be reserved for one or both reservation levels SRL1 and SRL2 and (3) one of the four category responses for each level. The message will also contain an indication of whether the selective trunk reservation level 1 or level 2 or both levels are to be given treatment, thus, denoting which of the category response tables in FIG. 2 will be used.

Processor 109 acknowledges the request by the manager and performs several tests to determine if the requested reservation treatment is a valid entry. For example, the processor will check to ascertain if it is an unused trunk group of if the number of trunks to be reserved is excessive for the number of trunks in the group or if this trunk group is a valid candidate for selective trunk reservation. Other similar checks may be performed to ascertain that the message is valid depending on the particular system involved. Should the processor determine that the request is invalid, the network manager will be informed via terminal 115 and told to reenter the request. If the request from the network manager can be complied with, the processor locates the network management table Z9NET in memory 110 and makes the appropriate entries.

Figure 4:
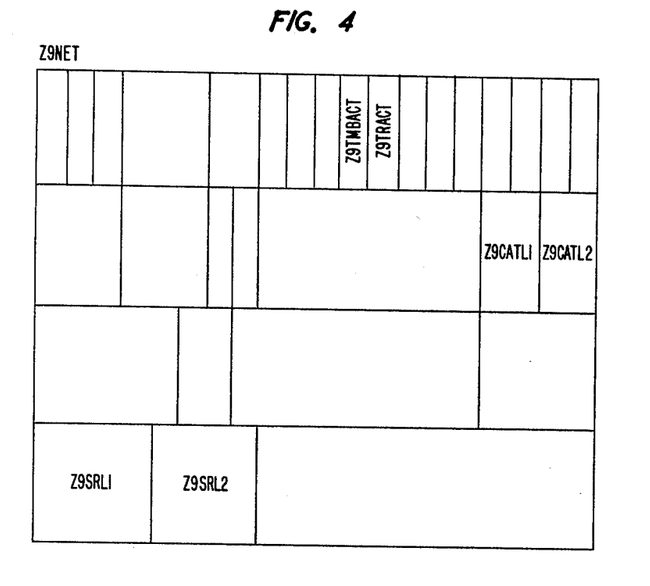
FIG. 4 shows a portion of a network management table associated with a trunk group.

The table Z9NET is shown in FIG. 4 and comprises a four word table provided for each trunk group. The processor enters the number of trunks to be reserved in locations Z9SRL1 and Z9SRL2. These entries represent the two possible levels of trunks that will be reserved for incoming traffic over the two-way trunk group. Thus, one traffic control function will be actuated if the number of idle trunks falls below the Z9SRL1 level and the more severe control will be implemented if the number of idle trunks falls below the Z9SRL2 level.

An entry in Z9CATL1 and Z9CATL2 will also be made in line 3 of the table to indicate one of the four category responses to be effective for the trunk group for each reservation level. In accordance with the flow chart in FIG. 3 the processor 109 also sets the selective trunk reservation switch Z9TRACT to "active" in line zero of the Z9NET table.

Figure 5:
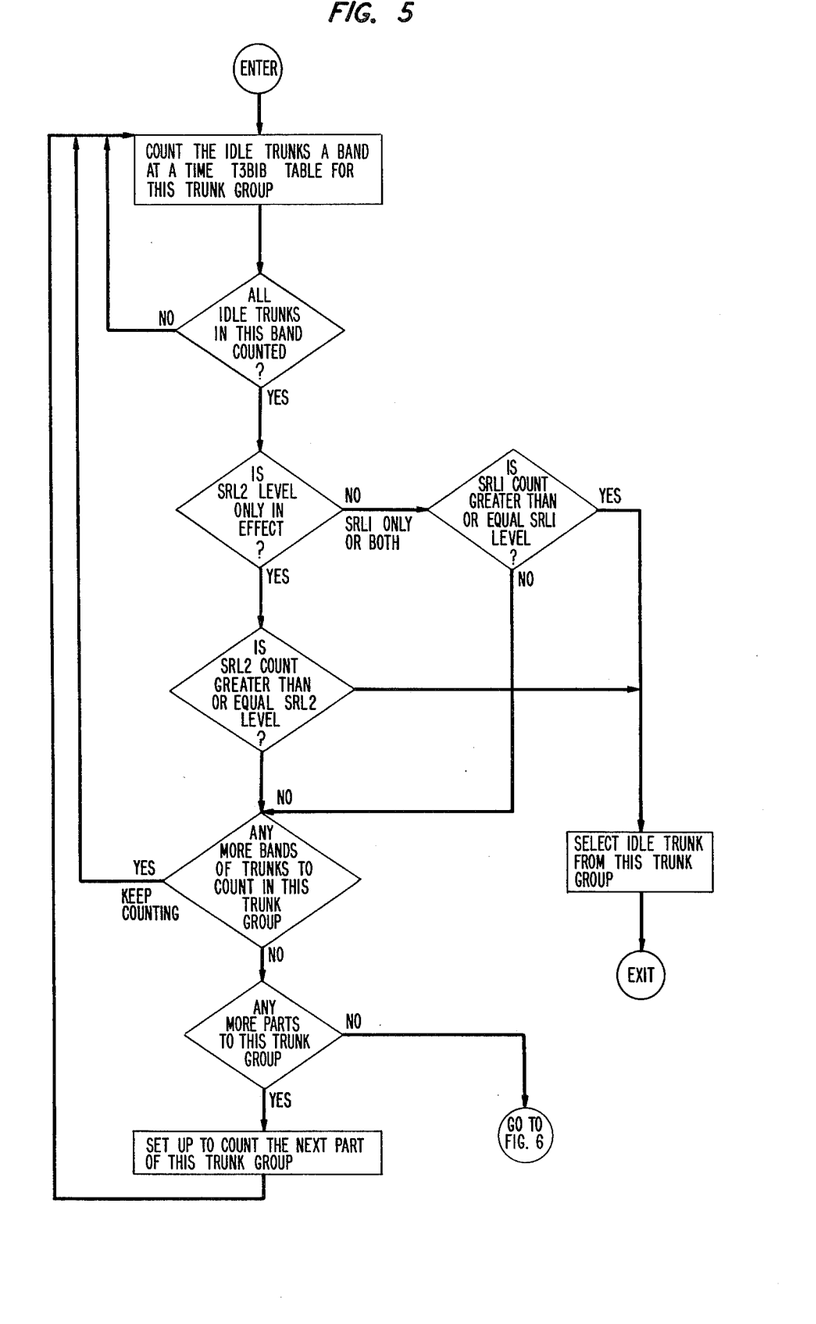
FIGS. 5, 6, and 7 when arranged according to FIG. 8 show a typical flow chart of the processor when the processor is processing a call under selective trunk reservation controls.
Figure 6:
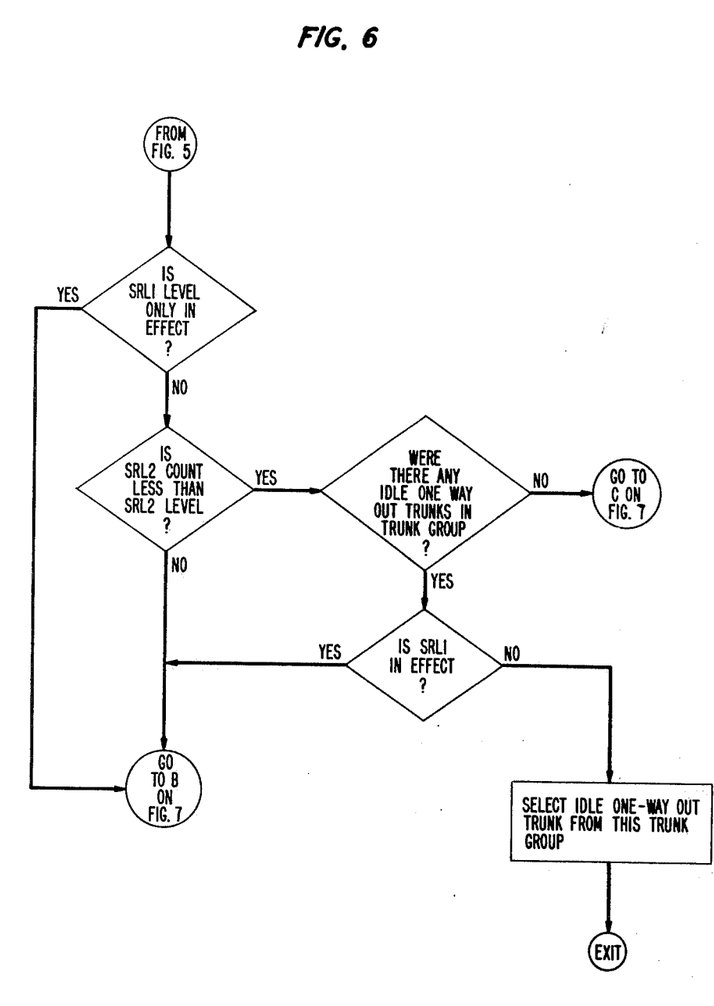
Figures 7, 8:
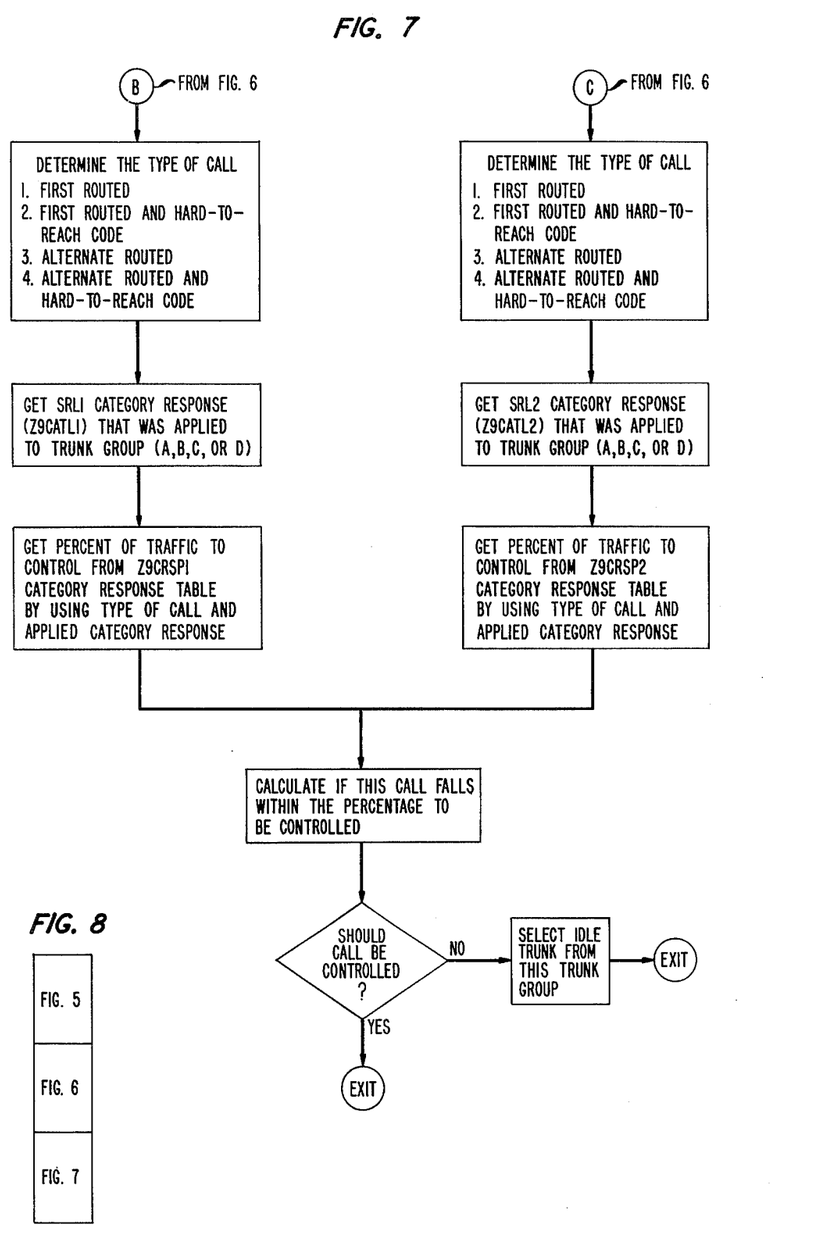

At this point the trunk group 118 has been put under selective trunk reservation control and calls outgoing from switching office A that can be routed via office B will be processed according to the flow chart set forth in FIGS. 5, 6 and 7 when arranged according to FIG. 8.

As mentioned above the processor determined the routing of a call by examining the first three digits which denote the office code or by examining the first six digits representing the area code and the office code for the called customer. If the first choice route for the call is to trunk group 118 the traffic is designated "first routed" traffic. On the other hand, if trunk group 118 is only used as an alternative route for the call, then the first choice route will be examined for idle trunks before the call is offered to trunk group 118. The processor keeps track in a call register (not shown) whether the call has been offered to other trunk groups before being offered to trunk group 118. This is significant when selective trunk reservation controls are in effect since different percentages of traffic will be blocked for calls that are alternated routed than calls that are offered to trunk group 118 as a first choice. It will be appreciated by those skilled in the art that the calls may be classified in ways other than first routed, alternate routed, and hard-to-reach calls without departing from the spirit and scope of the invention.

Figure 9:
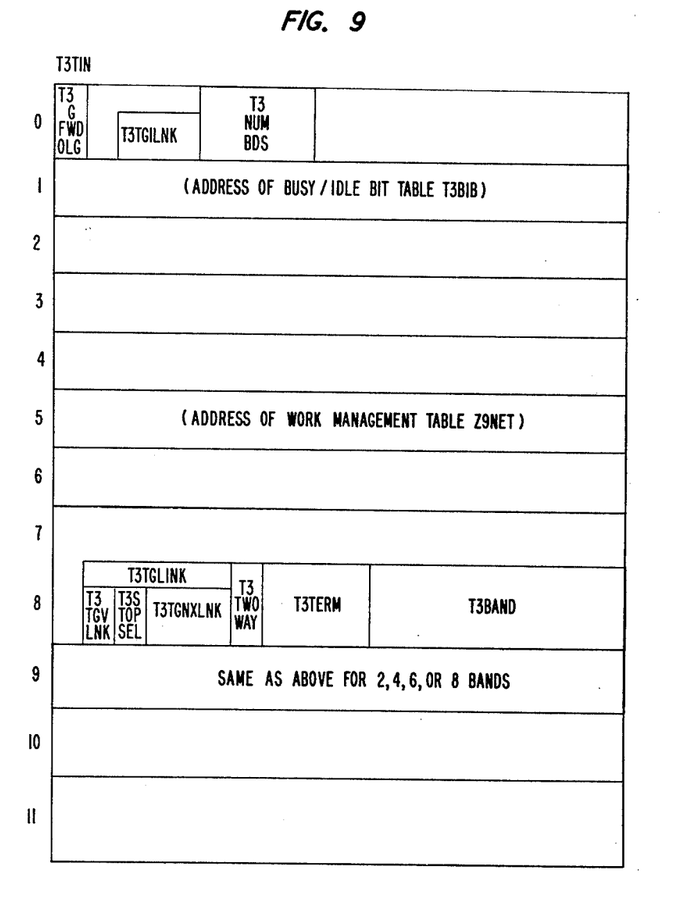
FIG. 9 shows a portion of a trunk information table.

The processor in performing the translation function ascertains that trunk group 118 is the appropriate trunk group and the processor is directed to trunk information table T3TIN an example of which is shown in FIG. 9. A table T3TIN is provided for every trunk group. The table defines the parameters of the trunk group and contains pointers to other tables where additional information about the trunks can be found. For example, on line 1 of the table is listed the address of a table designated T3BIB which contains the busy/idle indication for each trunk in the group. Also on line 5 of the T3TIN table is entered the address of the network management table Z9NET mentioned above.

The processor 109 goes to the network management table Z9NET (FIG. 4) and examines the Z9TRACT bit to determine if selective trunk reservation is active. If it is assumed that the traffic control feature has been activated, then the processor proceeds with the logic as set forth in the flow diagram of FIGS. 5–8. The processor goes to the T3BIB table which contains the busy/idle bits for all trunks in the group. The T3BIB table (not shown) contains a bit for each trunk and the trunks are arranged in bands of 16 trunks each. There is at least one table for each trunk group and each table represents as many as 128 trunks in the system being described.

The processor counts the number of trunks in each band and keeps a cumulative record of the count. Two counts are maintained. The SRL2 count includes both one-way and two-way trunks in the trunk group while the SRL1 count contains only the two-way trunks. The processor then examines the Z9NET FIG. 4 table to see if one or both levels of control are active. This information is contained in the Z9SRL1 and Z9SRL2 portions of the table along with the number of trunks to be reserved for each level. When the count of idle trunks for a band is completed the cumulative count for SRL1 is compared to the SRL1 threshold found in table Z9NET. If there are more idle trunks than the SRL1 threshold then the processor selects one of those idle trunks and exits this portion of the program as shown in FIG. 5. As shown in FIG. 6 if the count is less than the SRL1 threshold or the SRL1 control is not the only control that has been activated, the processor compares the SRL2 count against the SRL2 threshold found in the Z9NET table. If the count of idle trunks is greater than the SRL2 threshold found in this table then the processor looks for an idle outgoing trunk for the call providing the SRL1 control is not in effect as set forth in FIG. 6.

If the idle trunk count is less than the SRL2 level, the processor ascertains whether there are any idle one-way trunks in the group 118. When there are no idle one-way trunks in the group, the processor handles the call using the category response table Z9CRSP2 and the logic set forth in FIG. 7. If there are idle one-way trunks and the SRL1 control is not in effect, the processor selects an idle one-way trunk and exits this portion of the program.

The SRL1 control may be considered as providing a protectional reservation in that the control is primarily directed toward reserving percentages of the two-way trunks for incoming traffic.

The SRL2 control, on the other hand, has the additional feature of directionalizing the trunk group. No controls are implemented if one-way outgoing trunks are available and the SRL1 control is not in effect, but the category response table Z9CRSP2 is used when the number of trunks idle is less than the SRL2 level and there are no idle one-way trunks.

The processor will continue counting idle trunks a band at a time until one of the idle counts exceeds the threshold or there are no more bands of trunks to be counted in that particular trunk group.

Let it be assumed that a count of idle trunks in the group reveals that there are fewer idle trunks than both the SRL1 and SRL2 selective trunk reservation levels and that both SRL1 and SRL2 controls are in effect. Under these circumstances, the processsor will now perform the logic in FIG. 7 and examine a call register (not shown) to determine if the call is first routed or alternated routed to trunk group 118. For the purposes of this description it will be assumed that trunk group 118 is the first choice route for the call being described. Having determined this, the processor 109 then examines the Z9CBHTR table in FIG. 10 to ascertain whether the called destination code is classified as hard-to-reach.

Figure 10:
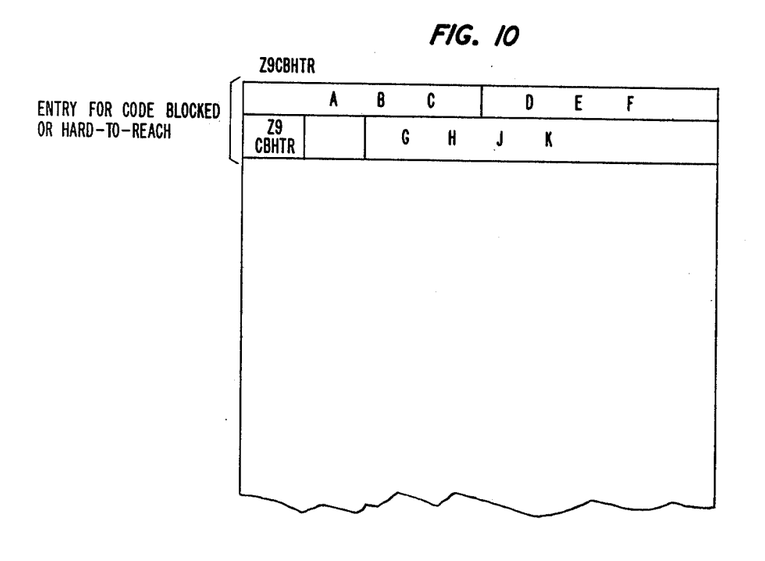
FIG. 10 shows a typical code block and hard-to-reach table.

The Z9CBHTR table contains a list of entries, each two words long, which designate those codes that are hard-to-reach from switching office A. A destination may be classified as hard-to-reach because it is in a particular foreign numbering plan area. Under these circumstances the three digit area code will be listed in the table. If, however, only certain destination offices in that area are classified as hard-to-reach both the area code and the three digit office codes will be listed in table Z9CBHTR. Furthermore, a called customer directory number might be considered hard-to-reach and this would be designated by the area code, office code and the four digits of the called number. The processor examines the Z9CBHTR table by the called code. If the code is listed in the table the processor looks at the Z9CBHTR bit. When this bit is set to "0" the code is considered hard-to-reach and if the bit is set to "1" the code is "blocked" and only a small percentage of calls may be completed to that code. For the call being described let it be assumed that the destination office code is listed in the table and that the Z9CBHTR bit is set to zero indicating a hard-to-reach code.

The processor now goes to the network management table Z9NET FIG. 4 and determines that selective trunk reservation is in effect by examining the Z9TRACT bit. Line 3 of the Z9NET table indicates that both reservation levels SRL1 and SRL2 are active so the processor examines line 1 and reads out of the network management table the category responses Z9CATL1 and Z9CATL2 for each level of reservation. Let it be assumed that the category response for both levels is category A.

As set forth in the flow chart on FIG. 7 the processor is now directed to one of the category response tables Z9CRSP1 and Z9CRSP2, but since it has already been determined that the level of idle trunks is less than the number reserved under the trunk reservation level SRL2 the processor only examines category response table Z9CRSP2. Indexing in that table to the information for first routed, hard-to-reach traffic under the category A, the processor ascertains that the control percentage is 75%. In other words, 75% of the calls in this class will be blocked from access to trunk group 118.

To determine if this particular call is to be blocked the processor generates a random number between zero and one-hundred and the percentage of calls to be blocked is compared to the number generated. If the percentage of calls to be blocked is greater than the number generated, the call is blocked from this trunk group and routed via another route or to announcement trunk. If on the other hand the number generated is less than the control percentage the call is permitted to use a trunk in this group. Other methods of determining whether the calls fall within the percentage to be blocked may be devised by those skilled in the art without departing from the spirit and scope of the invention.

If only the first level of selective trunk reservation were in effect the processor would interrogate the Z9CRSP1 table using the first routed, hard-to-reach class of call under category A. It can be seen from that table (FIG. 2) that all calls are offered to trunk group 118 under these circumstances and only calls that are alternated routed, hard-to-reach are blocked from the trunk group. The term "blocked" has been used throughout the description to denote the disposition of traffic effected by selective trunk reservation. The network manager, however, may at any time specify that this disposition be changed to allow an affected call to by-pass the selected trunk group and be allowed to attempt completion on a trunk group at a higher level in the routing hierarchy.

In summary, a method and apparatus have been described for dynamically reserving two-way trunks for calls incoming to a switching office when the number of idle trunks reaches a predetermined threshold. In response to each outgoing call destined for the two-way trunk group, a count is made of the idle trunks and compared to the threshold. If there are fewer trunks than the threshold, the switching office processor determines the disposition of the call by examining certain parameters such as the prior routing of the call and its destination. Using these parameters the processor ascertains what percentage of outgoing calls should be blocked in this class of traffic. If the call falls within the percentage, it is blocked, otherwise the call is offered to the two-way trunk group.

We claim:

1. In a telephone switching office having two-way interoffice trunks connected to another office, a method of reserving the trunks at one office for calls incoming from the other office, characterized by the steps of
    designating the number of two-way trunks to be reserved for incoming calls,
    counting the number of idle two-way trunks in response to each outgoing call destined for said two-way trunks.
    comparing the number of idle trunks with the designated number, and
    establishing a connection for said outgoing call based on the result of the comparison.

2. The method according to claim 1 wherein designating the number of two-way trunks to be reserved includes the step of selecting a particular percentage of outgoing calls to be denied access to the two-way trunks for each of a plurality of classes of outgoing calls, and
    wherein establishing a connection for said originating call comprises the step of ascertaining the class of each outgoing call.

3. In a telephone switching office having two-way interoffice trunks connected to another office, a method of reserving the trunks at one office for calls incoming from the other office, characterized by the steps of
    entering in a first memory a threshold number of trunks to be reserved for incoming traffic,
    entering in a second memory the percentage of each class of outgoing call to be blocked from access to the trunks,
    counting the number of idle trunks in response to each outgoing call,
    comparing the number of idle trunks with the threshold number in memory,
    ascertaining the class of each outgoing call, reading from the second memory for the particular class ascertained the percentage of calls to be blocked when the number of idle trunks is less than the threshold number, and
    determining whether the particular outgoing call should be blocked from access to the trunks.

4. The method according to claim 3 further comprising the step of entering a plurality of threshold numbers in the first memory,
    wherein entering a percentage of calls to be blocked comprises the step of entering in different portions of the second memory selected percentages for each of the plurality of thresholds,
    wherein comparing the number of idle trunks to a threshold comprises the step of comparing the number of idle trunks to each of the plurality of thresholds, and
    wherein reading from the second memory comprises the step of reading from that portion of the memory corresponding to the threshold of idle trunks which has been exceeded.

5. The method according to claim 4 wherein determining whether a particular call should be blocked comprises the steps of
    generating a random number less than one hundred,
    comparing the generated number with the percentage read from the second memory, and
    denying access to the trunks when the generated number exceeds the percentage.

6. In a telephone system having a first and a second switching office interconnected by two-way trunks, an arrangement for dynamically reserving the trunks at the first office for calls incoming from the second office comprising
    a first memory for storing a threshold number of two-way trunks to be reserved for incoming calls,
    a second memory for storing a percentage of calls to be blocked from access to said trunks,
    means responsive to each outgoing call destined for said two-way trunks for comparing the number of idle two-way trunks with the threshold number stored in said first memory, and means for denying outgoing calls access to said two-way trunks for a percentage of calls substantially equal to the percentage stored in said second memory.

7. The invention defined in claim 7 wherein means is provided for registering the class of each said outgoing call,
wherein said second memory comprises a plurality of memory locations each containing a percentage of calls to be blocked corresponding to a particular class of outgoing call, and
wherein said denying means comprises means for ascertaining the class of a particular one of said outgoing calls and for selecting one of said memory locations corresponding thereto.

* * * * *